United States Patent Office 3,441,622
Patented Apr. 29, 1969

3,441,622
PROCESS FOR CYCLOALKENES AND VARIOUS SUBSTITUTED CYCLOALKENES
David F. Gavin, New Haven, and Gerhard F. Ottmann, Hamden, Conn., assignors to Olin Mathieson Chemical Corporation, a corporation of Virginia
No Drawing. Filed Sept. 22, 1967, Ser. No. 669,684
Int. Cl. C07c 1/20, 5/00
U.S. Cl. 260—666       5 Claims

ABSTRACT OF THE DISCLOSURE

A process for preparing cycloalkenes and lower alkyl substituted cycloalkenes which comprises the vapor phase conversion of a nitrocycloalkane or a selected alkyl substituted nitrocycloalkane to the desired cycloalkene in the presence of aluminum phosphate in an inert atmosphere at a temperature between about 350° and 700° C.

---

This invention relates to a selected process for preparing cycloalkenes and various substituted cycloalkenes. More particularly, this invention relates to a vapor phase process for preparing cycloalkenes having 5 to 12 carbon atoms and their lower alkyl substituted derivatives.

The cycloalkenes provided according to the process of this invention are known compounds having a variety of useful applications. For example, they are widely used in the oil industry for various extraction procedures. They also are valuable as intermediates in the preparation of other useful chemicals, such as dicarboxylic acids, which, for example, can be converted to alkyd resins by polymerization with polyfunctional alcohols. Thus, Harries et al. in Ber., 41, 3557 (1908) described the preparation of adipic acid by hydrolysis of the reaction product of ozone with cyclohexene. In an analogous manner glutaric acid is obtained from cyclopentene, pimelic acid from cycloheptene, suberic acid from cyclooctene, azelaic acid from cyclononene, sebacic acid from cyclodecene, $\alpha,\omega$-decane dicarboxylic acid from cyclododecene, etc. The alkyl substituted cycloalkenes are also valuable chemicals having utility as solvents, swelling agents, diluents, etc. For example, they are useful plasticizers for poly(trifluorochloroethylene) polymers as disclosed in U.S. Patent 2,856,377.

Various processes for preparing cycloalkenes and lower alkyl substituted cycloalkenes have been previously reported in the literature. Thus, Zelinsky et al. in Ber. 34, 3252 (1901) disclose the synthesis of cyclohexene by the dehydration of cyclohexanol with oxalic acid at 100 to 110° C.

Now it has been found that cycloalkenes and alkyl substituted cycloalkenes can be conveniently prepared in a vapor phase process employing a nitrocycloalkane or a selected alkyl substituted nitrocycloalkane as a reactant. This process utilizes readily available or easily synthesized reactants and lends itself to an efficient, continuous operation which is highly advantageous in commercial applications.

The nitrocycloalkanes employed in the practice of this invention are those having 5 to 12 carbon atoms, i.e., nitrocyclopentane, nitrocyclohexane, nitrocycloheptane, nitrocyclooctane, nitrocyclononane, nitrocyclodecane, nitrocycloundecane and nitrocyclododecane. While many of these compounds are commercially available, all are readily prepared by nitration of the appropriate cycloalkane. For example, British Patent 720,646 describes the nitration of cyclooctane with aqueous nitric acid or nickel nitrate, while German Patent 1,060,859 discloses a similar preparative method for nitrocyclododecane.

The alkyl substituted nitrocycloalkanes which can be employed in the process of this invention include m- and p- mono- and di-substituted nitrocycloalkanes and preferably lower alkyl, that is alkyl having 1 to 4 carbon atoms, substituted nitrocycloalkanes having 5 to 12 ring carbon atoms. By m- and p-substituted nitrocycloalkane is meant cycloalkanes having alkyl ring substituents that are m- and p- with respect to the nitro group. Thus, among the suitable nitrocycloalkanes which can be employed herein are 1-methyl-3-nitrocyclohexane; 1-methyl-3-nitrocyclododecane; 1-methyl-4-nitrocyclopentane; 1,2-dimethyl-4-nitrocycloheptane; 1-n-propyl - 4 - nitrocyclohexane; 1-methyl-2-ethyl-4-nitrocyclooctane and 1-t-butyl-4-nitrocyclononane. These substituted nitrocyclohexanes can be readily provided by the reaction of the corresponding alkylcycloalkane with potassium nitrate or aluminum nitrate according to the process described by Nametkin, Chemisches Zentralblatt, II, 1377 (1910).

The process of this invention is carried out in the presence of aluminum phosphate catalyst. It is a surprising and unexpected feature of this invention that this particular catalyst selectively effects conversion of the nitrocycloalkane or alkyl substituted nitrocycloalkane to the desired cycloalkene or alkyl substituted cycloalkene. The catalyst may be employed in any one or combination of physical forms. Thus, pellitized aluminum phosphate is particularly suitable for use in the process of this invention. It is also feasible to employ aluminum phosphate which is supported on various carriers, for example asbestos, alumina, silicone, carbide, etc.

Another essential process requirement critical to the practice of this invention is the presence of an inert atmosphere. By the term inert atmosphere in the claims and specification herein is meant an atmosphere which is inert to the reactants and desired products. Thus, the use of a material which reacts with undesirable by-products, thereby favoring the production of the desired cycloalkene or alkyl substituted cycloalkene, may be used to provide an "inert atmosphere" within the scope of this invention. Any of the inert gases, for example nitrogen, helium, argon, neon and the like can be suitably employed in this process. Carbon monoxide is particularly preferred as providing an inert atmosphere conducive to the production of an excellent yield of the desired cycloalkene. Generally, the inert material is fed into the system continuously throughout the reaction period in order to insure the maintenance of a suitably inert atmosphere throughout the entire reaction.

The vapor phase process of this invention is carried out at a temperature between about 350 to about 700° C. and preferably at a temperature between about 450 to about 550° C. Conventional vapor phase equipment is employed, and high yields of the desired cycloalkene are readily obtained by merely contacting the nitrocycloalkene or alkyl substituted nitrocycloalkene reactant with the aluminum phosphate catalyst in the heated reaction zone. Preferably, a residence time of about .5 to 5 seconds is employed, and the desired products are readily isolated by conventional means, such as vapor phase chromatographic separation, distillation, filtration, and the like.

The following examples serve to illustrate the practice of this invention.

EXAMPLE 1

A 30" x 1" Pyrex glass tube was fitted with a receiver immersed in a cooling bath and followed by a trap cooled to −80° C. The 12" reaction zone was packed with a coiled length of asbestos cord coated with aluminum phosphate powder and then preheated to 500° C. in a nitrogen stream to remove moisture and other volatiles. After feeding carbon monoxide into the reaction zone, the addition of nitrocyclohexane was initiated at such a rate as to maintain a large excess of carbon monoxide in the reaction zone.

A total amount of 19.0 g. (.147 m.) of nitrocyclohexane was added to the reaction zone while maintaining a reaction temperature of 500° C. Vapor phase chromatographic analysis of the liquid contents of the receiver revealed that 8.60 g. of cyclohexene (77% corrected yield) had been obtained.

EXAMPLE 2

Following the procedure of Example 1 but employing nitrogen instead of carbon monoxide as the inert diluent, 26 g. of nitrocyclohexane were passed over the catalyst bed over a period of one hour. The condensable products in the cooled traps were analyzed by vapor phase chromatography which revealed that cyclohexene had been obtained. Infrared analysis revealed a C—H stretching vibration in the area of 3020 cm.$^{-1}$, thereby confirming the identification of the product.

What is claimed is:
1. A process for preparing cycloalkenes having 5 to 12 carbon atoms and lower alkyl substituted cycloalkenes having 5 to 12 ring carbon atoms which comprises
   (a) contacting an organic nitro compound selected from the group consisting of nitrocycloalkanes having 5 to 12 carbon atoms and m- and p- lower alkyl substituted nitrocyclohexanes having 5 to 12 ring carbon atoms with
   (b) aluminum phosphate in a closed reaction system at a temperature between about 350° to about 700° C. in the presence of an
   (c) inert atmosphere.
2. The process of claim 1 in which a temperature between about 450° and 550° C. is employed.
3. The process of claim 1 in which carbon monoxide is employed to provide the inert atmosphere.
4. The process of claim 1 in which nitrogen is employed to provide the inert atmosphere.
5. The process of claim 1 in which cyclohexene is provided by employing nitrocyclohexane as the organic nitro compound.

References Cited

UNITED STATES PATENTS

| | | | |
|---|---|---|---|
| 3,211,801 | 10/1965 | Holm | 260—683.2 |
| 3,304,342 | 2/1967 | Nolan | 260—666 |
| 2,997,509 | 8/1961 | Wirth | 260—681 |
| 2,281,804 | 5/1942 | Ruthruff | 260—683.2 |
| 3,275,698 | 9/1966 | Parish | 260—666 |

DELBERT E. GANZ, *Primary Examiner.*

V. O'KEEFE, *Assistant Examiner.*